(12) United States Patent
Burton et al.

(10) Patent No.: US 11,795,309 B2
(45) Date of Patent: Oct. 24, 2023

(54) OLEFIN-BASED POLYMER COMPOSITION WITH VOIDING AGENT AND ARTICLE

(71) Applicant: VOID Technologies Limited, Beaconsfield (GB)

(72) Inventors: Andrew Dennis Burton, Neenah, WI (US); Adam William Mix, Cranberry Township, PA (US); Ryan James McEneany, Appleton, WI (US)

(73) Assignee: VOID Technologies Limited, Beaconsfield (GB)

( * ) Notice: Subject to any disclaimer, the term of this patent is extended or adjusted under 35 U.S.C. 154(b) by 0 days.

(21) Appl. No.: 17/592,067

(22) Filed: Feb. 3, 2022

(65) Prior Publication Data

US 2022/0251354 A1 Aug. 11, 2022

Related U.S. Application Data

(60) Provisional application No. 63/146,941, filed on Feb. 8, 2021.

(51) Int. Cl.
*C08L 23/08* (2006.01)
*B29C 48/00* (2019.01)
*C08J 5/18* (2006.01)

(52) U.S. Cl.
CPC ...... *C08L 23/0815* (2013.01); *B29C 48/0018* (2019.02); *C08J 5/18* (2013.01);
(Continued)

(58) Field of Classification Search
CPC ............................. C08L 23/0815; C08L 25/12
See application file for complete search history.

(56) References Cited

U.S. PATENT DOCUMENTS 6,258,308 B1    7/2001  Brady et al.
6,444,302 B1 *  9/2002  Srinivas ................ C08L 23/142
                                                    525/240
(Continued)

FOREIGN PATENT DOCUMENTS

JP      53012542 B1 *   5/1978
WO      WO-9923139 A1 *  5/1999  ............ B32B 27/12
WO      2014/199271 A1  12/2014

OTHER PUBLICATIONS

T. Appleby et al., Polymer Bulletin, 32, 479-485 (1994).
(Continued)

*Primary Examiner* — Mark S Kaucher
(74) *Attorney, Agent, or Firm* — Boyle Fredrickson, S.C.

(57) ABSTRACT

In an embodiment, the present disclosure provides a composition composed of (A) a continuous phase composed of an olefin-based polymer, and (B) particles of a voiding agent dispersed in the continuous phase, the voiding agent composed of a functionalized styrene polymer having a glass transition temperature greater than or equal to 90° C. In another embodiment, the present disclosure provides an oriented article having (A) a continuous phase composed of an olefin-based polymer, and (B) particles of a voiding agent dispersed in the continuous phase. The voiding agent is composed of a functionalized styrene polymer having a glass transition temperature greater than or equal to 90° C. The oriented article includes (C) a plurality of elongated voids dispersed throughout the continuous phase. The oriented article has a density less than 0.9 g/cc.

19 Claims, 4 Drawing Sheets

SEM of Film from Inventive Example 2 after Machine Direction Orientation (52) U.S. Cl.
CPC ..... *C08L 2203/16* (2013.01); *C08L 2205/025* (2013.01); *C08L 2205/20* (2013.01); *C08L 2205/22* (2013.01); *C08L 2207/066* (2013.01)

(56) References Cited

U.S. PATENT DOCUMENTS

| | | | |
|---|---|---|---|
| 2014/0308496 A1* | 10/2014 | Bafna | B32B 27/205 |
| | | | 428/218 |
| 2016/0102185 A1 | 4/2016 | Topolkaraev et al. | |
| 2016/0115291 A1 | 4/2016 | Topolkaraev et al. | |
| 2016/0122484 A1 | 5/2016 | Topolkaraev et al. | |

OTHER PUBLICATIONS

M. Costagliola et al., Journal of Materials Science, 14, 1152-1158 (1979).

R. Fayt et al., Journal of Polymer Science: Part B: Polymer Physics, vol. 27, 775-793 (1989).

\* cited by examiner

Figure 1: SEM of Film from Inventive Example 2 after Machine Direction Orientation

Figure 2: SEM of Film from Inventive Example 5 after Machine Direction Orientation Figure 3: SEM of Film from comparative sample 10 before Machine Direction Orientation

Figure 4: SEM of Film from comparative sample 11 before Machine Direction Orientation

US 11,795,309 B2

OLEFIN-BASED POLYMER COMPOSITION WITH VOIDING AGENT AND ARTICLE

BACKGROUND

Designers and manufacturers, particularly in the automotive and packaging industries, are increasing efforts to implement lightweighting. "Lightweighting" is the practice of reducing a manufactured article's weight for the benefit of promoting environmental sustainability and reducing cost through the supply chain.

Known lightweighted materials include polymeric foams and polymeric materials with cavities. Foaming is performed while the polymeric material is in the molten state, which disadvantageously reduces melt strength and prevents the polymer from strain hardening, resulting in finished foamed products with low mechanical strength.

Cavitated polymeric materials are produced by dispersing micro-scale and/or nano-scale inclusions into polymeric materials and subsequently orienting (or stretching) the polymeric materials; the presence of the inclusions forming micro-scale and/or nano-scale cavities, or voids, within the oriented polymeric materials. Mechanical properties for the oriented cavitated polymeric materials are determined by the orientation conditions, and the composition of the polymeric materials in conjunction with the composition of the inclusion material(s). Consequently, the art recognizes the ongoing need for lightweighting, in this case utilizing new materials to yield oriented cavitated polymeric products with concomitant new and improved mechanical properties.

SUMMARY

The present disclosure provides a composition. In an embodiment, the composition is composed of (A) a continuous phase composed of an olefin-based polymer and (B) particles of a voiding agent dispersed in the continuous phase. The voiding agent is composed of a functionalized styrene polymer having a glass transition temperature greater than or equal to 90° C.

The present disclosure provides an article. In an embodiment, the article is an oriented article having (A) a continuous phase composed of an olefin-based polymer, and (B) particles of a voiding agent dispersed in the continuous phase. The voiding agent is composed of a functionalized styrene polymer having a glass transition temperature greater than or equal to 90° C. The oriented article includes (C) a plurality of elongated voids dispersed throughout the continuous phase. The oriented article has a density less than 0.9 g/cc.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1 or 2, or 3 to 5, or 6, or 7), any subrange between any two explicit values is included (e.g., the range 1-7 above includes 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The terms "blend" or "polymer blend," as used herein, is a blend of two or more polymers. Such a blend may or may not be miscible (not phase separated at molecular level). Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low-density polyethylene (LDPE) and linear polyethylene. Nonlimiting examples of linear polyethylene include linear low density polyethylene (LLDPE), ultra-low density polyethylene (ULDPE), very low density polyethylene (VLDPE), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

An "extrudate" is a molten polymeric composition exiting an extrusion die at or above the melt temperature of the polymeric composition. A "solidified extrudate" is an extrudate which has been cooled into a solid form such as an article in nonlimiting forms as a film, a fiber, a filament, a sheet, or a tube, for example.

A "heteroatom" is an atom other than carbon or hydrogen. The heteroatom can be a non-carbon atom from Groups IV, V, VI and VII of the Periodic Table. Nonlimiting examples of heteroatoms include: F, N, O, P, B, S, and Si.

A "hydrocarbon" is a compound containing only hydrogen atoms and carbon atoms. A "hydrocarbonyl" (or "hydrocarbonyl group") is a hydrocarbon having a valence (typically univalent).

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer. LLDPE is characterized by little, if any, long chain branching, in contrast to conventional LDPE. LLDPE has a density from 0.910 g/cc to less than 0.940 g/cc.

"Low density polyethylene" (or "LDPE") consists of ethylene homopolymer, or ethylene/α-olefin copolymer comprising at least one $C_3$-$C_{10}$ α-olefin that has a density from 0.915 g/cc to less than 0.940 g/cc and contains long chain branching with broad MWD. LDPE is typically produced by way of high-pressure free radical polymerization (tubular reactor or autoclave with free radical initiator).

An "olefin-based polymer" or "polyolefin" is a polymer that contains more than 50 weight percent polymerized olefin monomer (based on total amount of polymerizable monomers), and optionally, may contain at least one comonomer. A nonlimiting examples of an olefin-based polymer is ethylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably.

The term "styrene" as used herein, is a monomer having the Structure (A) as shown below.

Structure (A)

Test Methods

Average cross-sectional diameter for particles. The term "cross-sectional diameter of a particle" is the diameter of the particles or the major axis when viewed in the plane of the machine direction (when the particle is not spherical). Scanning electron micrograph (SEM) images were analyzed in order to quantify the average cross-sectional diameter of the "voiding agents" (described in the Detailed Description below) formed in the film. SEM images of the cross-sections of films, formed by (i) extrusion only or (ii) extrusion and Machine Direction Orientation (MDO), at a magnification of 3000× (Coxem EM30N) to 4,000× (JEOLJSM-6500F Field-emission gun Scanning electron microscope (FEG-SEM)) were used for the analysis. Each particle was measured at the widest point in the cross section to determine the cross-sectional diameter. The analysis involved using software tool μScope Essentials from PixeLINK. A reference marker on the images was used for calibration of distance.

Degree of orientation. Film (monolayer film or multilayer film) is stretched in the longitudinal direction (also known as the machine direction) by way of a machine direction orienter which heats a film and subsequently draws the heated film between rotating rolls to extend the film beyond the original length of the film, the stretched film then cooled. The "degree of orientation" for a stretched film (or oriented film) is reported in terms of the original film length, i.e., an oriented film with a "6×" degree of orientation is a film stretched six times longer than the original film length.

Density for films was determined using an analytical balance to measure the mass of a film to the ten-thousandth of a gram (g) and a pycnometer (Accupyc 1340, Micromeritics Norcross, Ga.) to measure the volume of the sample to the ten-thousandth of a cubic centimeter (cc). The pycnometer used sulfur hexafluoride gas as the medium to determine volume. Density was determined by the pycnometer software where film mass was divided by film volume, with results reported in g/cc.

Density for polymers was measured in accordance with ASTM D792. The result is recorded in grams (g) per cubic centimeter (g/cc).

Elongated voids. The minimum cross section, maximum cross section, average cross section were determined by the measurements of the major axis length and minor axis length of elongated voids from analysis of SEM images as previously disclosed for particle diameter measurement. The elongated void minimum aspect ratio, maximum aspect ratio, and average aspect ratio are determined by the ratio of the major axis length divided by the minor axis length.

Glass transition temperature, Tg, was measured in accordance with ASTM D3418 with results reported in degrees Celsius (° C.).

Optical density was measured using an X-rite 331C Transmission Densitometer and used to calculate film opacity using the following formula $$\text{opacity}=100-10^{(2-optical\ density)}$$

with results reported in percent (%).

Melt index (MI) for ethylene-based polymers, was measured in accordance with ASTM D1238, Condition 190° C./2.16 kg with results reported in grams per 10 minutes (g/10 min). Melt index or melt flow rate of non-ethylene based polymers will have varied conditions.

Tensile strength was measured in accordance with ASTM D882, with results reported in megaPascals (MPa). Normalized Ultimate tensile strength is a normalized tensile strength where the peak tensile strength as measured in accordance with ASTM D882 is divided by the film's specific gravity as determined by taking the film's measured density divided by the density of water at 1 gram per cubic centimeter. The Normalized Ultimate Tensile Strength is recorded in megapascals (MPa).

DETAILED DESCRIPTION

The present disclosure provides a composition. In an embodiment, the composition includes (A) a continuous phase composed of an olefin-based polymer, and (B) particles of a voiding agent dispersed in the continuous phase. The voiding agent includes a functionalized styrene polymer having a glass transition temperature greater than or equal to 90° C.

A. Olefin-Based Polymer

The composition includes a continuous phase composed of one or more olefin-based polymers. Nonlimiting examples of suitable olefin-based polymer include propylene-based polymer, ethylene-based polymer, and combinations thereof.

Nonlimiting examples of suitable propylene-based polymer include propylene homopolymer, propylene/ethylene copolymer, propylene/$C_4$-$C_{10}$ α-olefin copolymer, propylene impact copolymer, and combinations thereof. Nonlimiting examples of $C_4$-$C_{10}$ α-olefin comonomer include butene, hexene, octene, and combinations thereof. As used herein, styrene is not an α-olefin.

Nonlimiting examples of suitable ethylene-based polymer include ethylene homopolymer, ethylene/$C_3$-$C_{10}$ α-olefin copolymer (linear or branched), ethylene/$C_4$-$C_8$ α-olefin copolymer (linear or branched), high density polyethylene ("HDPE"), low density polyethylene ("LDPE"), linear low density polyethylene ("LLDPE"), medium density polyethylene ("MDPE"), and combinations thereof. Nonlimiting examples of suitable $C_3$-$C_{10}$ α-olefin comonomers include propylene, butene, hexene, octene, and combinations thereof. Nonlimiting examples of suitable $C_4$-$C_8$ α-olefin comonomers include butene, hexene, octene, and combinations thereof.

B. Voiding Agent

The composition includes particles of a voiding agent dispersed in the continuous phase. A "voiding agent," (or "VA") as used herein, is particulate material that is incompatible with the polymeric material(s) in the continuous phase so that, upon stretching of the composition (or an article composed of the composition), voids form around some, or all, or substantially all, of the particles of the voiding agent. Nonlimiting examples of shape for the particles of voiding agent include elliptical, spherical, cylindrical, plate-like, or tubular, and combinations thereof.

The voiding agent is composed of one or more functionalized styrene polymers. A "functionalized styrene polymer," as used herein (hereafter interchangeably referred to as "FSP"), is a polymer composed of (i) units derived from styrene, (ii) units derived from a comonomer having a functional group with one or more heteroatoms, and (iii) optionally units derived from a third monomer (a "termonomer"), the functional styrene polymer having a glass transition temperature (Tg) from greater than or equal to 90° C., or from greater than 90° C. to 180° C., or from 91° C. to 170° C., or from 95° C. to 150° C., or from 100° C. to 145° C., or from 105° C. to 140° C., or from 110° C. to 135° C., or from 107° C. to 120° C., or from 95° C. to 110° C. Nonlimiting examples of suitable heteroatoms present in the FSP comonomer include oxygen (O) and nitrogen (N). Nonlimiting examples of suitable functional groups with one or more heteroatoms include maleic anhydride, acrylic acid, methacrylic acid, acrylate, methacrylate, acrylonitrile, amide, imide, and combinations thereof. As the functionalized styrene polymer includes a comonomer having a functional group containing a heteroatom, the functionalized styrene polymer is compositionally and structurally distinct compared to polystyrene, styrenic-block copolymers (SBS, SIS, SEBS), and other polymers composed solely of hydrocarbon.

In an embodiment, the FSP is selected from styrene maleic anhydride (SMA), styrene-n-phenylmaleimide-maleic anhydride copolymer (SMI), styrene methyl methacrylate (SMMA), styrene acrylonitrile (SAN), acrylonitrile styrene acrylate (ASA), and combinations thereof.

In an embodiment, the FSP is selected from styrene maleic anhydride (SMA), styrene acrylonitrile (SAN), acrylonitrile styrene acrylate (ASA), and combinations thereof.

In an embodiment, the FSP is styrene maleic anhydride (SMA).

In an embodiment, the FSP is styrene acrylonitrile (SAN).

The particles of the voiding agent have an average cross-section diameter from 0.2 microns to less than 2.0 microns. In an embodiment, the particles of the voiding agent have an average cross-section diameter from 0.3 microns to 0.97 microns, or from 0.4 microns to 0.8 microns.

In an embodiment, the voiding agent is composed of a blend of the functionalized styrenic-based polymer particles and particles of a co-voiding agent. The particles of the co-voiding agent are composed of a polymer selected from a polyester, a polystyrene, a polyamide, and combinations thereof.

The composition is formed by melt blending the olefin-based polymer (and optional blend component) (A), the voiding agent (B), and optional additives. Nonlimiting examples of suitable additives include slip agent, anti-block agent, nucleator, anti-static agent, UV stabilizer, pigment, processing aid, plasticizer, lubricant, and combinations thereof. The components may be added simultaneously, or substantially simultaneously, directly into a melt blending device. Alternatively, the components are dry mixed together to form a homogeneous dry mixture, the dry mixture subsequently introduced into a melt blending device. The melt blending device disperses the voiding agent throughout the continuous phase of the olefin-based polymer by way of batch melt blending and/or continuous melt blending. Nonlimiting examples of suitable melt blending devices include mixer/kneader, Banbury mixer, Farrel continuous mixer, single-screw extruder, a twin-screw extruder, a roll mill, and combinations thereof. The melt blending procedure produces the present composition with particles of the voiding agent uniformly dispersed throughout the olefin-based polymer continuous phase.

In an embodiment, the composition contains from 70 wt % to 97 wt % of (A) a continuous phase that is one or more LLDPEs, each LLDPE having a density from 0.90 g/cc to 0.93 g/cc, from 3 wt % to 30 wt % of (B) particles of a voiding agent composed of styrene maleic anhydride (SMA), styrene-n-phenylmaleimide-maleic anhydride copolymer (SMI), styrene methyl methacrylate (SMMA), styrene acrylonitrile (SAN), acrylonitrile styrene acrylate (ASA), and combinations thereof, and the particles are uniformly dispersed throughout the continuous phase, the particles having an average cross-section diameter from 0.3 microns to 0.9 microns, or from 0.4 microns to 0.8 microns.

In an embodiment, the composition contains from 70 wt % to 97 wt % of (A) a continuous phase that is one or more LLDPEs, each LLDPE having a density from 0.90 g/cc to 0.93 g/cc, from 3 wt % to 30 wt % of (B) particles of a voiding agent composed of styrene maleic anhydride (SMA) having a Tg from 110° C. to 135° C., and the particles are uniformly dispersed throughout the continuous phase, the particles having an average cross-section diameter from 0.3 microns to 0.9 microns, or from 0.4 microns to 0.8 microns.

In an embodiment, the composition contains from 70 wt % to 97 wt % of (A) a continuous phase that is one or more LLDPEs, each LLDPE having a density from 0.90 g/cc to 0.93 g/cc, from 3 wt % to 30 wt % of (B) particles of a voiding agent composed of styrene acrylonitrile (SAN) having a Tg from 95° C. to 110° C., and the particles are uniformly dispersed throughout the continuous phase, the particles having an average cross-section diameter from 0.3 microns to 0.9 microns, or from 0.4 microns to 0.8 microns.

In an embodiment, the composition contains from 70 wt % to 97 wt % of (A) a continuous phase that is one or more LLDPEs, each LLDPE having a density from 0.90 g/cc to 0.93 g/cc, from 3 wt % to 30 wt % of (B) particles of a voiding agent composed of a mixture of a styrene maleic anhydride (SMA) having a Tg from 110° C. to 135° C. and a styrene acrylonitrile (SAN) having a Tg from 95° C. to 110° C., the particles uniformly dispersed throughout the continuous phase, the particles having an average cross-section diameter from 0.3 microns to 0.9 microns, or from 0.4 microns to 0.8 microns.

In an embodiment, a masterbatch is used to form the composition. A "masterbatch," (or "MB") as used herein, is composed of (i) two or more voiding agents (with optional additives) at least one of the voiding agents being an FSP, or (ii) one or more voiding agents (and optional additives) in a carrier resin, the carrier resin being an olefin-based polymer and at least one of the voiding agents being an FSP. The masterbatch serves as a concentrate of the voiding agent. The masterbatch is formed by dry mixing the components and/or melt blending (e.g., polymer mixed in the melt phase) the components.

In an embodiment, the masterbatch is formed into pellets.

The masterbatch is subsequently added to one or more film resins (also known as a "letdown resin"). Nonlimiting examples of suitable film resin include olefin-based polymer such as propylene-based polymer, ethylene-based polymer, and combinations thereof.

For the film resin, nonlimiting examples of suitable propylene-based polymer include propylene homopolymer, propylene/ethylene copolymer, propylene/$C_4$-$C_{10}$ α-olefin copolymer, propylene impact copolymer, and combinations thereof. Nonlimiting examples of $C_4$-$C_{10}$ α-olefin comonomer include butene, hexene, octene, and combinations thereof. As used herein, styrene is not an α-olefin.

For the film resin, nonlimiting examples of suitable ethylene-based polymer include ethylene homopolymer, ethylene/$C_3$-$C_{10}$ α-olefin copolymer (linear or branched), ethylene/$C_4$-$C_8$ α-olefin copolymer (linear or branched), high density polyethylene ("HDPE"), low density polyethylene ("LDPE"), linear low density polyethylene ("LLDPE"), medium density polyethylene ("MDPE"), and combinations thereof. Nonlimiting examples of suitable $C_3$-$C_{10}$ α-olefin comonomers include propylene, butene, hexene, octene, and combinations thereof. Nonlimiting examples of suitable $C_4$-$C_8$ α-olefin comonomers include butene, hexene, octene, and combinations thereof.

The masterbatch is "let down" into the film resin, typically by melt blending the masterbatch and the film resin in an extruder. In an embodiment, the masterbatch is added to, or otherwise is "let down" into, the film resin in an amount from 5 wt % to 40 wt %, or from 8 wt % to 30 wt %, or from 10 wt % to 25 wt % based on the total weight of the MB/film resin blend to obtain from 2 wt % to 35 wt %, or from 4 wt % to 20 wt % voiding agent based on the total weight MB/film resin blend. The extrusion melt blending uniformly disperses the masterbatch throughout the MB/film resin blend.

In an embodiment, masterbatch pellets are composed of (A) from 10 wt % to 70 wt % of a continuous phase that is an LLDPE (a first LLDPE) having a density from 0.90 g/cc to 0.93 g/cc, and (B) from 90 wt % to 30 wt % of particles of a voiding agent composed of styrene maleic anhydride (SMA) having a Tg from 110° C. to 135° C. The masterbatch pellets are loaded, or otherwise letdown, into a film resin that is a second LLDPE which may or may not be different than the first LLDPE. The masterbatch pellets are letdown into the second LLDPE by way of a single screw extruder in an amount from 5 wt % to 30 wt % based on the total weight of the MB/film resin blend to obtain from 2 wt % to 20 wt % voiding agent present in the MB/film resin blend, based on the total weight MB/film resin blend. The particles are uniformly dispersed, or substantially uniformly dispersed, throughout the MB/film resin blend, the particles having an average cross-section diameter from 0.3 microns to 0.9 microns, or from 0.4 microns to 0.8 microns.

The MB/film resin blend is extruded to form an extrudate. An "extrudate," as used herein, is (i) a monolayer structure formed from the MB/film resin blend or (ii) a multilayer structure with one or more film layers formed from the MB/film resin blend.

The solidified extrudate is subjected to an orientation procedure (otherwise known as a drawing procedure, or a stretching procedure) where the solidified extrudate is formed into an oriented article. An "oriented article," as used herein, is an article that has been subjected to monoaxial orientation, (drawing or stretching in the machine direction or transverse direction) and/or biaxial orientation (drawing or stretching in the machine direction and the transverse direction). Nonlimiting examples of suitable orientation procedures include aspiration (e.g., fiber draw units), tensile frame drawing, machine direction orienter (MDO), tenter frame for transverse drawing, biaxial drawing, multi-axial drawing, profile drawing, vacuum drawing, and combinations thereof.

The solidified extrudate is oriented (drawn, or otherwise is stretched), in the machine direction and/or in the transverse direction at a temperature less than the melting temperature of the solidified extrudate to form an oriented article. In an embodiment, the solidified extrudate is drawn in the machine direction to stretch the article to a degree of orientation from 2 times (2×), or 3×, or 4× to 5×, or 6×, or 7×, 8×, 9×, or 10×.

The drawing procedure produces voids in the resultant oriented article. A "void," as used herein, is a structure within the oriented article that is not occupied by polymeric material and is not occupied by voiding agent, the void being an empty space within the oriented article. The void as used herein, has a major axis with an average length from 0.8 microns to 24 microns and a minor axis with an average length from 0.2 microns to 2.0 microns, for uniaxial stretched oriented article.

Bounded by no particular theory, it is believed the deformation and elongational strain imparted during the drawing procedure creates localized shear zones near the voiding agent particles due to the incompatibility between the voiding agent and the continuous phase. The shear zones cause debonding in the continuous phase near the voiding agent particles. As the voids are formed, the continuous phase deforms and creates internal stretched areas that strain-harden. The voids grow, or otherwise elongate, in the direction of orientation, to form a network of elongated voids. The oriented article embodies a closed-cell structure of elongated voids homogeneously dispersed throughout the oriented article; the closed-cell structure reduces the density (i.e., lightweighting) of the oriented article while the molecular orientation of the continuous phase yields strain-hardening that enhances tensile strength, increases thermal resistance, increases impact strength of the oriented article, when compared to the pre-stretched article.

The present FSP voiding agent has a higher Tg compared to the Tg of conventional polystyrene. The higher Tg of the present FSP voiding agent makes the voids (or cavities) less likely to collapse when heat is applied to an oriented article composed of the FSP.

The present disclosure provides an article. In an embodiment, an oriented article is provided and includes (A) a continuous phase composed of one or more olefin-based polymers. The oriented article includes (B) particles of the voiding agent dispersed in the continuous phase. The voiding agent includes the functionalized styrene polymer having a glass transition temperature greater than or equal to 90° C. The oriented article includes (C) a plurality of elongated voids uniformly dispersed throughout the continuous phase. The oriented article has a density less than 0.9 g/cc, or a density from 0.65 g/cc to less than 0.9 g/cc, or from 0.70 g/cc to 0.89 g/cc, or from 0.73 g/cc to 0.88 g/cc.

Nonlimiting examples of suitable oriented articles include oriented film article (oriented monolayer film or oriented multilayer film), oriented sheet (oriented monolayer sheet or oriented multilayer sheet), oriented fiber (oriented monolayer fiber or oriented multilayer fiber), oriented filament, oriented tube (oriented monolayer tube or oriented multilayer tube), and combinations thereof.

In an embodiment, the oriented article contains one or more olefin-based polymers (i) dissimilar in monomer type, and/or (ii) dissimilar in monomer weight percent, and/or (iii) dissimilar in density, and/or (iv) dissimilar in melt index, and/or (v) dissimilar in melt temperature when compared to the olefin-based polymer of the continuous phase. In this way, the oriented article is composed at least two or more different olefin-based polymers. The oriented article also contains particles of the voiding agent dispersed in the one or more olefin-based polymers.

In an embodiment, the oriented article is an oriented monolayer film. The oriented monolayer film includes:
  from 70 wt % to 97 wt % of one or more LLDPEs (continuous phase), each LLDPE having a density from 0.90 g/cc to 0.93 g/cc,
  from 3 wt % to 30 wt %, or from 5 wt % to 25 wt %, or from 7 wt % to 20 wt % (based on total weight percent of the monolayer film) particles of a voiding agent selected from SMA, SMI, SMMA, SAN, ASA, and combinations thereof, the particles uniformly dispersed throughout the oriented monolayer film, the particles having an average cross-section diameter from 0.3 microns to 0.98 microns, or from 0.4 microns to 0.8 microns;
  elongated voids dispersed throughout the oriented monolayer film; and
  the oriented monolayer film has a density from 0.65 g/cc to less than 0.9 g/cc, or from 0.70 g/cc to 0.89 g/cc, or from 0.73 g/cc to 0.88 g/cc.

In an embodiment, the oriented article is an oriented monolayer film. The oriented monolayer film includes:
  a first LLDPE (carrier resin from masterbatch), the first LLDPE having a density from 0.90 g/cc to 0.93 g/cc;
  a second LLDPE (film resin) different than, or the same as the first LLDPE, the second LLDPE having a density from 0.90 g/cc to 0.93 g/cc;
  from 3 wt % to 30 wt %, or from 5 wt % to 25 wt %, or from 7 wt % to 20 wt % (based on total weight of the monolayer film) particles of a voiding agent composed of styrene maleic anhydride (SMA) having a Tg from 110° C. to 135° C., the particles uniformly dispersed throughout the oriented monolayer film, the particles having an average cross-section diameter from 0.3 microns to 0.9 microns, or from 0.4 microns to 0.8 microns;
  elongated voids dispersed throughout the oriented film; and
  the oriented monolayer film has a density from 0.65 g/cc to less than 0.9 g/cc, or from 0.70 g/cc to 0.89 g/cc, or from 0.73 g/cc to 0.88 g/cc.

In an embodiment, the oriented article is an oriented monolayer film. The oriented monolayer film includes:
  a first LLDPE (carrier resin from masterbatch), the first LLDPE having a density from 0.90 g/cc to 0.93 g/cc;
  a second LLDPE (film resin) different than, or the same as the first LLDPE, the second LLDPE having a density from 0.90 g/cc to 0.93 g/cc;
  from 3 wt % to 30 wt %, or from 5 wt % to 25 wt %, or from 7 wt % to 20 wt % (based on total weight of the monolayer film) particles of a voiding agent composed of a mixture maleic anhydride modified styrene (SMA) having a Tg from 110° C. to 135° C. and styrene acrylonitrile (SAN) having a Tg from 95° C. to 110° C., the particles uniformly dispersed throughout the oriented monolayer film, the particles having an average cross-section diameter from 0.3 microns to 0.9 microns, or from 0.4 microns to 0.8 microns;
  elongated voids dispersed throughout the oriented film; and the oriented monolayer film has a density from 0.65 g/cc to less than 0.9 g/cc, or from 0.70 g/cc to 0.89 g/cc, or from 0.73 g/cc to 0.88 g/cc.

In an embodiment, the oriented article is an oriented multilayer film. The oriented multilayer film has 2, or 3, or 4, or 5, or 6, or 7, or 8, or 9 layers, or more and at least one layer of the multilayer film includes:

from 70 wt % to 97 wt % of one or more LLDPEs (continuous phase), each LLDPE having a density from 0.90 g/cc to 0.93 g/cc, from 3 wt % to 30 wt %, or from 5 wt % to 25 wt %, or from 7 wt % to 20 wt % (based on total weight percent of the film layer) particles of a voiding agent selected from SMA, SMI, SMMA, SAN, ASA, and combinations thereof, the particles uniformly dispersed throughout the film layer, the particles having an average cross-section diameter from 0.3 microns to 0.98 microns, or from 0.4 microns to 0.8 microns;

elongated voids dispersed throughout the film layer; and the oriented multilayer film has a density from 0.65 g/cc to less than 0.9 g/cc, or from 0.70 g/cc to 0.89 g/cc, or from 0.73 g/cc to 0.88 g/cc.

In an embodiment, the oriented article is an oriented multilayer film. The oriented multilayer film has 2, or 3, or 4, or 5, or 6, or 7, or 8, or 9 layers, or more and at least one layer of the multilayer film includes:

a first LLDPE (carrier resin from masterbatch), the first LLDPE having a density from 0.90 g/cc to 0.93 g/cc;

a second LLDPE (film resin) different than, or same as the first LLDPE, the second LLDPE having a density from 0.90 g/cc to 0.93 g/cc;

from 3 wt % to 30 wt %, or from 5 wt % to 25 wt %, or from 7 wt % to 20 wt % (based on total weight of the layer) particles of a voiding agent composed of styrene maleic anhydride (SMA) having a Tg from 110° C. to 135° C., the particles uniformly dispersed throughout the film layer, the particles having an average cross-section diameter from 0.3 microns to 0.9 microns, or from 0.4 microns to 0.8 microns;

elongated voids uniformly dispersed throughout the film layer; and the oriented multilayer film has a density from 0.65 g/cc to less than 0.9 g/cc, or from 0.70 g/cc to 0.89 g/cc, or from 0.73 g/cc to 0.88 g/cc.

In an embodiment, the oriented article is an oriented multilayer film. The oriented multilayer film has 2, or 3, or 4, or 5, or 6, or 7, or 8, or 9 layers, or more and at least one layer of the multilayer film includes:

a first LLDPE (carrier resin from masterbatch), the first LLDPE having a density from 0.90 g/cc to 0.93 g/cc;

a second LLDPE (film resin) different than, or same as the first LLDPE, the second LLDPE having a density from 0.90 g/cc to 0.93 g/cc;

from 3 wt % to 30 wt %, or from 5 wt % to 25 wt %, or from 7 wt % to 20 wt % (based on total weight of the monolayer film) particles of a voiding agent composed of a mixture of styrene maleic anhydride (SMA) having a Tg from 110° C. to 135° C. and styrene acrylonitrile (SAN) having a Tg from 95° C. to 110° C., the particles uniformly dispersed throughout the film layer, the particles having an average cross-section diameter from 0.3 microns to 0.9 microns, or from 0.4 microns to 0.8 microns;

elongated voids uniformly dispersed throughout the film layer; and the oriented multilayer film has a density from 0.65 g/cc to less than 0.9 g/cc, or from 0.70 g/cc to 0.89 g/cc, or from 0.73 g/cc to 0.88 g/cc.

By way of example, and not limitation, some embodiments of the present disclosure will now be described in detail in the following examples.

EXAMPLES

Materials used in the examples are set forth in Table 1 below.

TABLE 1

| Material | Description |
|---|---|
| LLDPE1 | LLDPE, ethylene/hexene copolymer<br>d: 0.912 g/cc, MI: 1.0 g/10 min |
| LLDPE2 | LLDPE, ethylene/hexene copolymer<br>d: 0.918 g/cc, MI: 1.0 g/10 min |
| GPPS1 | Polystyrene,<br>d: 1.04 g/cc, Tg: 93° C., MFR: 10 @ 200° C./5 kg<br>Vicat: 213° C. |
| SMA1 | Voiding agent, styrene maleic anhydride<br>d: 1.08 g/cc, Tg: 114° C., Mw: 245,000 g/mol |
| SAN1 | Voiding agent, styrene acrylonitrile (SAN)<br>d: 1.08 g/cc, Tg: 105° C. |

Inventive Example A—monolayer film. A composition composed of 9 wt % styrene maleic anhydride, (SMA1), and 91 wt % linear low density polyethylene, LLDPE2, was dry-blended and subsequently extruded into a monolayer cast film (Haake PolyLab-QC, Karlsruhe, Germany). The film extrusion line consisted of a 20 mm single screw extruder with length of 400 mm. The SMA1/LLDPE2 blend was extruded through a flat sheet die with an opening of 200 mm width and 0.4 mm height. The extruder was run at 130 rpm delivering a rate of 4 kg/hr. The film formed and collected using a casting cart consisting of 2 chrome rolls maintained at 45° C. and a take-up roll speed setting of 240 on the casting cart.

Films were mechanically deformed in the machine direction using a Machine Direction Orienter (MDO, POTOP Guangzhou, China). The MDO consisted of an unwind, 3 pre-heat rolls, 2 pairs of stretching rolls, 4 annealing rolls and 2 cooling rolls and a winder. The mechanical deformation was achieved by stretching the film between two rolls of varying speed in one stretching zone. Film was fed into the MDO at a speed of 5 meters per minute and stretched to a degree of orientation of 5×, 6×, and 7×. After MDO stretching, films were tested for density. For the film having a 6× degree of orientation for uniaxial stretched film, the density was 0.8140 g/cc.

Inventive example 1. A masterbatch composition of 60 wt % styrene maleic anhydride, SMA1, and 40 wt % linear low density polyethylene, LLDPE1 was created using a twin screw extruder (Coperion ZSK-26, Sewell N.J.) and pelletized. The twin screw extruder consisted of 48:1 L/D with screw diameter of 26 mm. The masterbatch composition was extruded at a speed of 200 rpm at a temperature of 230° C. The masterbatch pellets were dry blended at 5 wt % in to a film resin, LLDPE2, forming a MB/film resin blend composition of 3 wt % SMA1 and 2 wt % LLDPE1 and 95 wt % LLDPE2. The dry MB/film resin blend composition was extruded into the core layer of a three-layer blown film with skin layers composed of a blend of 96 wt % LLDPE2 with 4 wt % diatomaceous earth antiblock on a 3 layer blown film line (Labtech LF-600, Samut Prakarn, Thailand). The multilayer film extrusion line consisted of a 45 mm core single screw extruder (33:1 L:D) with two 30 mm skin single screw extruders (30:1 L:D). The skin and core compositions were extruded through a die with an opening diameter of 120 mm and 2.25 mm die gap. The extruders were set to create a three-layer film with 15%/70%/15% ratio by volume and was run at 35 kg/hr. The three-layer film was formed by inflating the molten polymer to form a bubble and then collapsing the bubble into two layers of flat film. The diameter of the bubble in relation to the die size was 2.3 and defined as the blow-up ratio. The edges of the multilayer film were then slit and the films were collected as two discrete rolls of film using a torque controlled winder.

The three-layer films were mechanically deformed in the machine direction using a Machine Direction Orienter (MDO, POTOP Guangzhou, China). The MDO consisted of an unwind, 3 pre-heat rolls, 2 pairs of stretching rolls, 4 annealing rolls and 2 cooling rolls and a winder. The mechanical deformation was achieved by stretching the film between two rolls of varying speed in a stretching zone. The multilayer film was fed into the MDO at a speed of 5 meters per minute and stretched to a degree orientation of 5× and a degree of orientation of 6× in a single stretch zone. Data for the three-layer film stretched uniaxially to a degree of orientation of 6× is provided in Table 2 below.

Inventive example 2. Same preparation as inventive example 1, except that the dry blend composition in the core layer was 9 wt % SMA1 and 6 wt % LLDPE1 and 85 wt % LLDPE2 (based on the total weight of the core layer).

Inventive Example 3. Same preparation as inventive example 1, except that the dry blend composition in the core layer was 21 wt % SMA1 and 14 wt % LLDPE1 and 65 wt % LLDPE2 (based on the total weight of the core layer).

Inventive Example 4. A masterbatch composition of 60 wt % styrene acrylonitrile, SAN1, and 40 wt % linear low density polyethylene, LLDPE1, was created using a twin screw extruder (Coperion ZSK-26, Sewell N.J.) and pelletized. The twin screw extruder consisted of 48:1 LID with screw diameter of 26 mm. The masterbatch composition was extruded at a speed of 200 rpm at a temperature of 230° C. The masterbatch pellets were dry blended at 10 wt % into carrier resin LLDPE2 forming a MB/film resin blend composition of 6 wt % SAN1, 4 wt % LLDPE1 and 90 wt % LLDPE2. The dry blend composition was extruded into the core layer of a three-layer blown film with skin layers composed of a blend of 96 wt % LLDPE2 and 4 wt % diatomaceous earth antiblock on a 3 layer blown film line (Labtech LF-600, Samut Prakarn, Thailand). The three-layer film extrusion line consisted of a 45 mm core single screw extruder (33:1 L:D) with two 30 mm skin single screw extruders (30:1 L:D). The skin and core compositions were extruded through a die with an opening diameter of 120 mm and 1.38 mm die gap. The extruders were set to create a three-layer film with 15%/70%/15% ratio by volume and was run at 35 kg/hr. The three-layer film was formed by inflating the molten polymer to form a bubble and then collapsing the bubble into two layers of flat film. The diameter of the bubble in relation to the die size was 2.3 and defined as the blow-up ratio. The edges of the multilayer film were then slit and the films were collected as 2 discrete rolls of film using a torque controlled winder.

Three-layer films were mechanically deformed in the machine direction using a Machine Direction Orienter (MDO, POTOP Guangzhou, China). The MDO consisted of an unwind, 3 pre-heat rolls, 2 pairs of stretching rolls, 4 annealing rolls and 2 cooling rolls and a winder. The mechanical deformation was achieved by stretching the three-layer film between two rolls of varying speed in one stretching zone. Three-layer film was fed into the MDO at a speed of 5 meters per minute and stretched to a degree of orientation of 5× and a degree of orientation of 6×. Data for the three-layer film uniaxially stretched to a degree of orientation of 6× is provided in Table 2 below.

Inventive example 5. Same preparation as inventive example 4, except that the dry blend composition in the core layer was 9 wt % SAN1, 6 wt % LLDPE1, and 85 wt % LLDPE2 (based on the total weight of the core layer).

Inventive example 6. Same preparation as inventive example 4, except that the dry blend composition in the core layer was 12 wt % SAN1, 8 wt % LLDPE1 and 80 wt % LLDPE2 (based on the total weight of the core layer).

Inventive example 7. A masterbatch composition of 30 wt % styrene maleic anhydride, SMA1, 30 wt % styrene acrylonitrile SAN1 and 40% linear low density polyethylene, LLDPE1, was created using a twin screw extruder (Coperion ZSK-26, Sewell N.J.) and pelletized. The twin screw extruder consisted of 48:1 L/D with screw diameter of 26 mm. The masterbatch composition was extruded at a speed of 200 rpm at a temperature of 230° C. The masterbatch pellets were dry blended at 15 wt % into carrier resin, LLDPE2, forming a MB/film resin blend composition of 4.5 wt % SMA1, 4.5 wt % SAN1, 6 wt % LLDPE1 and 85 wt % LLDPE2. The dry blend composition was extruded into the core layer of a three-layer blown film with skin layers composed of a blend of 96 wt % LLDPE2 and 4 wt % diatomaceous earth antiblock on a 3 layer blown film line (Labtech LF-600, Samut Prakarn, Thailand). The film extrusion line consisted of a 45 mm core single screw extruder (33:1 L:D) with two 30 mm skin single screw extruders (30:1 L:D). The skin and core compositions were extruded through a die with an opening diameter of 120 mm and 1.38 mm die gap. The extruders were set to create a three-layer film with 15%/70%/15% ratio by volume and was run at 35 kg/hr. The three-layer film was formed by inflating the molten polymer to form a bubble and then collapsing the bubble into two layers of flat film. The diameter of the bubble in relation to the die size was 2.3 and defined as the blow-up ratio. The edges of the multilayer film were then slit and the films were collected as 2 discrete rolls of film using a torque controlled winder.

Three-layer films were mechanically deformed in the machine direction using a Machine Direction Orienter (MDO, POTOP Guangzhou, China). The MDO consisted of an unwind, 3 pre-heat rolls, 2 pairs of stretching rolls, 4 annealing rolls and 2 cooling rolls and a winder. The mechanical deformation was achieved by stretching the three-layer film between two rolls of varying speed in one stretching zone. Three-layer film was fed into the MDO at a speed of 5 meters per minute and stretched to a degree of orientation of 5× and a degree of orientation of 6×. Data for three-layer film uniaxially stretched to a degree of orientation of 6× is provided in Table 2 below.

Inventive example 8. A masterbatch composition of 15 wt % general purpose polystyrene, GPPS1, 45 wt % styrene acrylonitrile, SAN1, and 40% linear low density polyethylene, LLDPE1, was created using a twin screw extruder (Coperion ZSK-26, Sewell N.J.) and pelletized. The twin screw extruder consisted of 48:1 LID with screw diameter of 26 mm. The masterbatch composition was extruded at a speed of 200 rpm at a temperature of 230° C. The masterbatch pellets were dry blended at 15 wt % into carrier resin, LLDPE2, forming a MB/film resin blend composition of 2.25 wt % GPPS1, 6.75 wt % SAN1, 6 wt % LLDPE1, and 85 wt % LLDPE2. The dry blend composition was extruded into the core layer of a three-layer blown film with skin layers composed of a blend of 96 wt % LLDPE2 and 4 wt % diatomaceous earth antiblock on a three-layer blown film line (Labtech LF-600, Samut Prakarn, Thailand). The film extrusion line consisted of a 45 mm core single screw extruder (33:1 L:D) with two 30 mm skin single screw extruders (30:1 L:D). The skin and core compositions were extruded through a die with an opening diameter of 120 mm and 2.25 mm die gap. The extruders were set to create a three-layer film with 15%/70%/15% ratio by volume and was run at 35 kg/hr. The multilayer film was formed by inflating the molten polymer to form a bubble and then collapsing the bubble into two layers of flat film. The diameter of the bubble in relation to the die size was 2.3 and defined as the blow-up ratio. The edges of the film were then slit and the films were collected as 2 discrete rolls of film using a torque controlled winder.

Three-layer films were mechanically deformed in the machine direction using a Machine Direction Orienter (MDO, POTOP Guangzhou, China). The MDO consisted of an unwind, 3 pre-heat rolls, 2 pairs of stretching rolls, 4 annealing rolls and 2 cooling rolls and a winder. The mechanical deformation was achieved by stretching the three-layer film between two rolls of varying speed in one stretching zone. Three-layer film was fed into the MDO at a speed of 5 meters per minute and stretched to a degree of orientation of 5× and a degree of orientation of 6×. Data for the three-layer films uniaxially stretched to a degree of orientation of 6× is included in provided in Table 2 below.

Comparative sample 9. As a comparative control, a composition composed of 100 wt % linear low density polyethylene, LLDPE2, (based on the total weight of the core layer) was extruded into the core layer of a three-layer blown film with skin layers composed of a blend of 96 wt % LLDPE2 and 4 wt % diatomaceous earth antiblock on a three-layer blown film line (Labtech LF-600, Samut Prakarn, Thailand). The film extrusion line consisted of a 45 mm core single screw extruder (33:1 L:D) with two 30 mm skin single screw extruders (30:1 L:D). The skin and core compositions were extruded through a die with an opening diameter of 120 mm and 1.38 mm die gap. The extruders were set to create a three-layer film with 15%/70%/15% ratio by volume and was run at 35 kg/hr. The multilayer film was formed by inflating the molten polymer to form a bubble and then collapsing the bubble into two layers of flat film. The diameter of the bubble in relation to the die size was 2.3 and defined as the blow-up ratio. The edges of the film were then slit and the films were collected as 2 discrete rolls of film using a torque controlled winder.

Three-layer films were mechanically deformed in the machine direction using a Machine Direction Orienter (MDO, POTOP Guangzhou, China). The MDO consisted of an unwind, 3 pre-heat rolls, 2 pairs of stretching rolls, 4 annealing rolls and 2 cooling rolls and a winder. The mechanical deformation was achieved by stretching the film between two rolls of varying speed in one stretching zone. Three-layer film was fed into the MDO at a speed of 5 meters per minute and stretched to a degree of orientation of 5× and a degree of orientation of 6×. Data for three-layer film uniaxially stretched to a degree of orientation of 6× is provided in Table 2 below.

Comparative sample 10. As a comparative control, a masterbatch composition of 60 wt % calcium carbonate $CaCO_3$, 40% linear low density polyethylene, LLDPE2, was dry blended at 50 wt % into film resin LLDPE2 forming a MB/film resin blend composition of 30 wt % $CaCO_3$, and 70 wt % LLDPE2. The dry blend composition was extruded into the core layer of a three-layer blown film with skin layers composed of a blend of LLDPE2 and 4 wt % diatomaceous earth antiblock on a 3 layer blown film line (Labtech LF-600, Samut Prakarn, Thailand). The film extrusion line consisted of a 45 mm core single screw extruder (33:1 L:D) with two 30 mm skin single screw extruders (30:1 L:D). The skin and core compositions were extruded through a die with an opening diameter of 120 mm and 1.38 mm die gap. The extruders were set to create a three-layer film with 15%/70%/15% ratio by volume and was run at 35 kg/hr. The multilayer film was formed by inflating the molten polymer to form a bubble and then collapsing the bubble into two layers of flat film. The diameter of the bubble in relation to the die size was 2.3 and defined as the blow-up ratio. The edges of the multilayer film were then slit and the films were collected as 2 discrete rolls of film using a torque controlled winder.

Three-layer films were mechanically deformed in the machine direction using a Machine Direction Orienter (MDO, POTOP Guangzhou, China). The MDO consisted of an unwind, 3 pre-heat rolls, 2 pairs of stretching rolls, 4 annealing rolls and 2 cooling rolls and a winder. The mechanical deformation was achieved by stretching the three-layer film between two rolls of varying speed in one stretching zone. Three-layer film was fed into the MDO at a speed of 5 meters per minute and stretched to a degree of orientation of 5× and a degree of orientation of 6×. Data for three-layer film uniaxially stretched to a degree of orientation of 6× is provided in Table 2 below.

Comparative sample 11. As a comparative control, a masterbatch composition composed of 60 wt % general purpose polystyrene GPPS1, 40% linear low density polyethylene, LLDPE1, was created using a twin screw extruder (Coperion ZSK-26, Sewell N.J.) and pelletized. The twin screw extruder consisted of 48:1 LID with screw diameter of 26 mm. The masterbatch composition was extruded at a speed of 200 rpm at a temperature of 230° C. The masterbatch pellets were dry blended at 15 wt % into film resin LLDPE2 forming a MB/film resin blend composition of 9 wt % GPPS1, 6 wt % LLDPE1 and 85 wt % LLDPE2. The dry blend composition was extruded into the core layer of a three-layer blown film with skin layers composed of a blend of LLDPE2 and 4% diatomaceous earth antiblock on a 3 layer blown film line (Labtech LF-600, Samut Prakarn, Thailand). The film extrusion line consisted of a 45 mm core single screw extruder (33:1 L:D) with two 30 mm skin single screw extruders (30:1 L:D). The skin and core compositions were extruded through a die with an opening diameter of 120 mm and 1.38 mm die gap. The extruders were set to create a three-layer film with 15%/70%/15% ratio by volume and was run at 35 kg/hr. The multilayer film was formed by inflating the molten polymer to form a bubble and then collapsing the bubble into two layers of flat film. The diameter of the bubble in relation to the die size was 2.3 and defined as the blow-up ratio. The edges of the film were then slit and the films were collected as 2 discrete rolls of film using a torque controlled winder.

Three-layer films were mechanically deformed in the machine direction using a Machine Direction Orienter (MDO, POTOP Guangzhou, China). The MDO consisted of an unwind, 3 pre-heat rolls, 2 pairs of stretching rolls, 4 annealing rolls and 2 cooling rolls and a winder. The mechanical deformation was achieved by stretching the three-layer film between two rolls of varying speed in one stretching zone. Three-layer film was fed into the MDO at a speed of 5 meters per minute and stretched to a degree of orientation of 5× and a degree of orientation of 6×. Data for three-layer film uniaxially stretched to a degree of orientation of 6× is provided in Table 2 below.

In Table 2, the extrusion temperature for 1E1-6, 1E8, and CS9-11 was 250° C.; the extrusion temperature for IE-A was 230° C. and the extrusion temperature for IE7 was 210° C.

Figure 1:
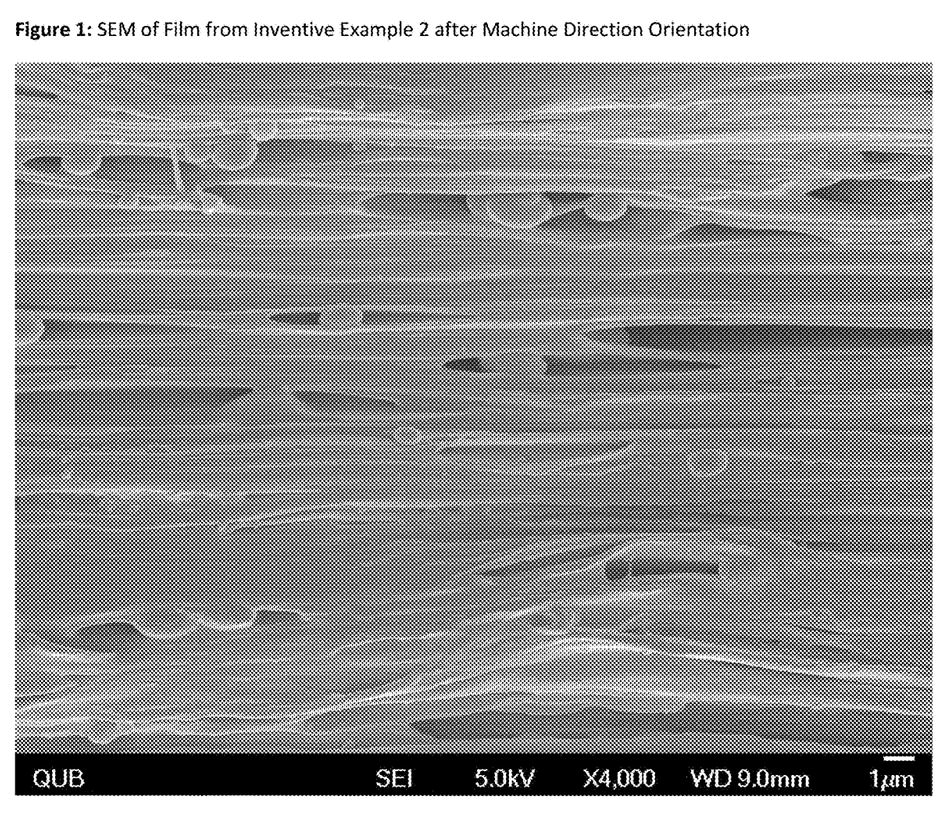
FIG. 1 is a scanning electron micrograph (SEM) (taken at a magnification of 4,000×) of the core layer of Inventive Example 2 after machine direction orientation (MDO).
Figure 2:
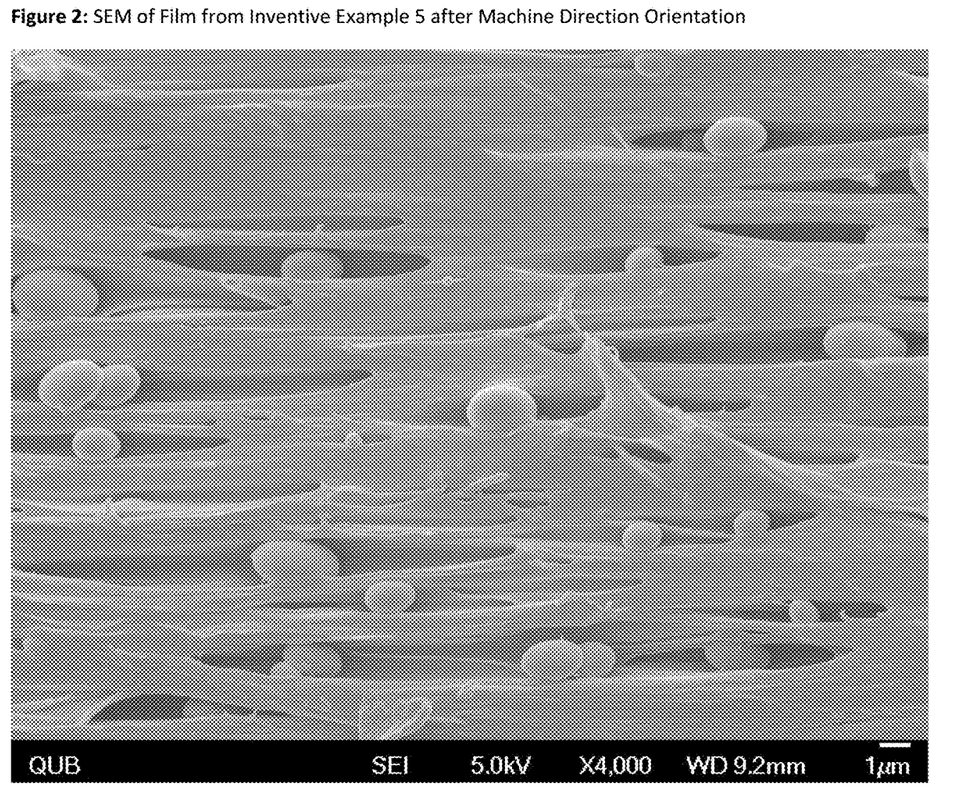
FIG. 2 is an SEM (taken at a magnification of 4,000×) of the core layer of Inventive Example 5 after machine direction orientation (MDO).
Figure 3:
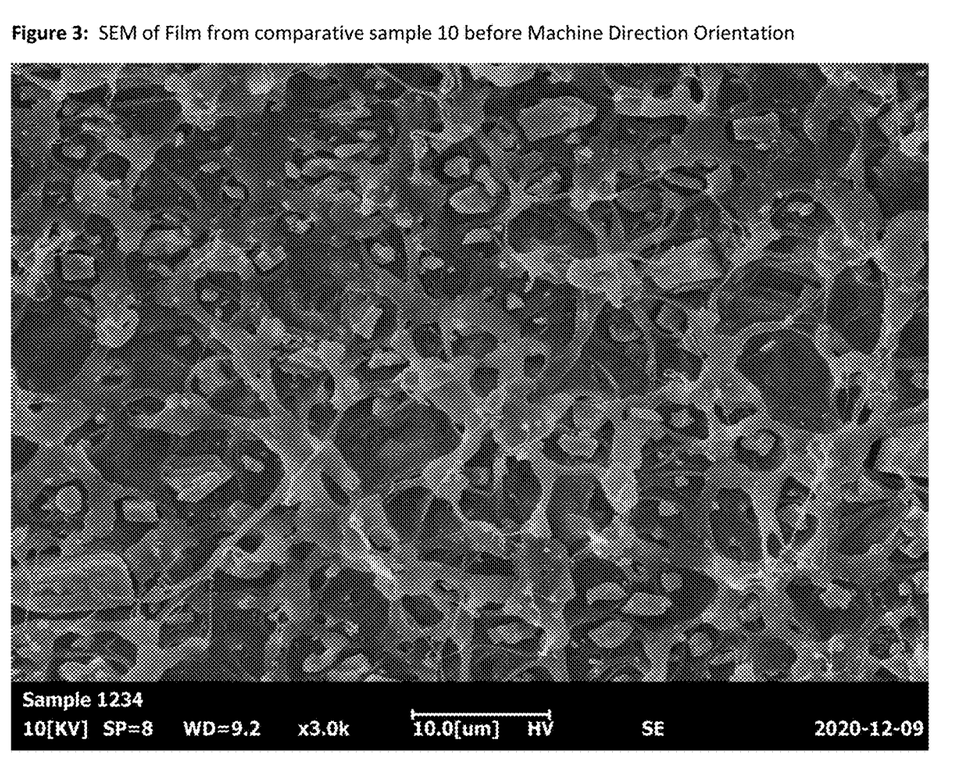
FIG. 3 is an SEM (taken at a magnification of 3,000×) of the core layer of Comparative Sample 10 before machine direction orientation (MDO).
Figure 4:
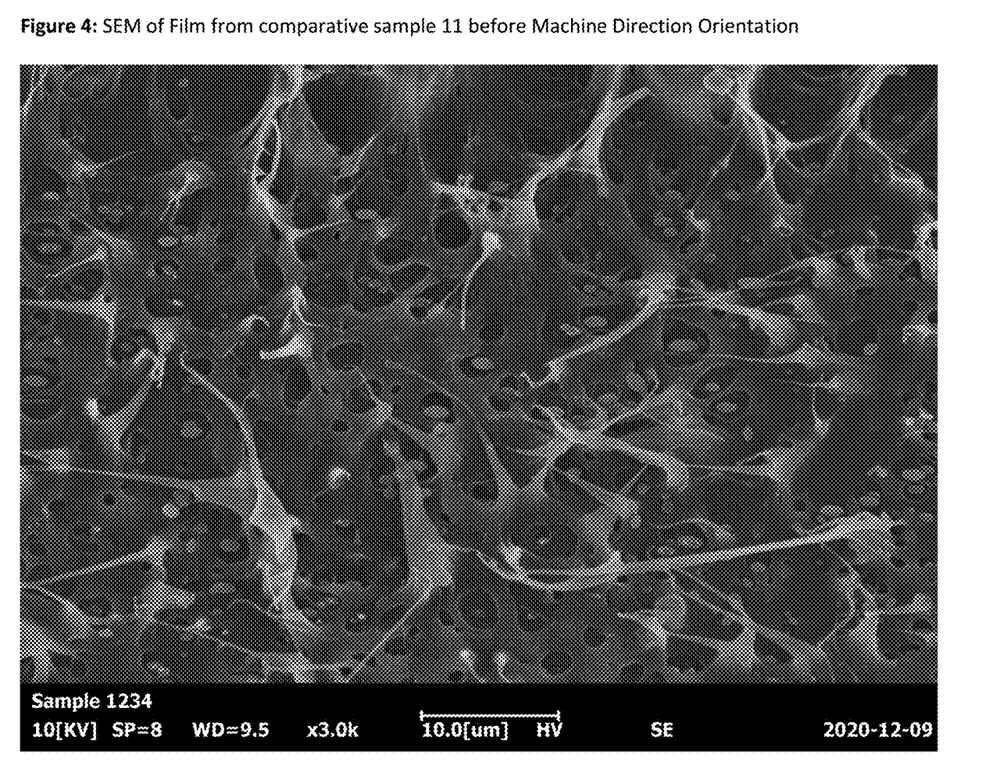
FIG. 4 is an SEM (taken at a magnification of 3,000×) of the core layer of Comparative Sample 11 before machine direction orientation (MDO).

Table 3 provides the dimensions of the elongated voids present in the core layer of 1E2 film and 1E5 film as shown in respective FIG. 1 and FIG. 2.

TABLE 2

| VA | Film Density (g/cm³) | Optical Density | Opacity (%) | Thickness (micron) | Modulus (MPa) | Elongation at Break (%) | Break Stress (MPa) | Normalized Ultimate Tensile Strength (MPa) | VA Min Cross section um | VA Max Cross section um | VA Average Cross section um | VA Min Aspect ratio | VA Max Aspect ratio | VA Average Aspect ratio |
|---|---|---|---|---|---|---|---|---|---|---|---|---|---|---|
| IE-A* SMA1/LLDPE1 | 0.8140 | | | | | | | | | | | | | |
| IE1 SMA1 | 0.8501 | 0.19 | 35.4 | 25.4 | 531.2 | 50.0 | 203.6 | 239.5 | | | | | | |
| IE2 SMA1 | 0.7745 | 0.3 | 49.9 | 27.9 | 494.7 | 46.5 | 182.0 | 235.0 | 0.2144 | 1.1364 | 0.5974 | 1.1968 | 3.6215 | 1.8883 |
| IE3 SMA1 | 0.7313 | 0.4 | 60.2 | 34.3 | 518.6 | 61.8 | 186.2 | 254.6 | | | | | | |
| IE4 SAN1 | 0.7846 | 0.26 | 45.0 | 27.9 | 532.8 | 39.5 | 175.7 | 223.9 | | | | | | |
| IE5 SAN1 | 0.7563 | 0.32 | 52.1 | 30.5 | 517.8 | 40.7 | 161.5 | 213.5 | 0.1607 | 1.6365 | 0.9427 | 1.0769 | 3.2594 | 1.7199 |
| IE6 SAN1 | 0.7192 | 0.35 | 55.3 | 29.2 | 455.9 | 39.9 | 152.0 | 211.3 | | | | | | |
| IE7 SMA1/SAN1 | 0.7895 | 0.31 | 51.0 | 25.4 | 534.7 | 43.4 | 187.9 | 238.0 | | | | | | |
| IE8 GPPS1/SMA1/SAN1 | 0.796 | 0.38 | 58.3 | 29.2 | 531.7 | 42.2 | 189.7 | 238.3 | | | | | | |
| CS9 N/A | 0.9067 | 0.02 | 4.5 | 25.4 | 604.1 | 49.3 | 236.6 | 260.9 | | | | | | |
| CS10 CaCO3 | 0.7719 | 0.42 | 62.0 | 30.0 | 446.2 | 53.5 | 174.8 | 226.5 | 0.2832 | 5.0458 | 1.6571 | 0.8038 | 7.1167 | 1.8038 |
| CS11 GPPS1 | 0.796 | 0.38 | 58.3 | 29.2 | 531.7 | 42.2 | 189.7 | 238.3 | 0.3095 | 1.4725 | 0.6230 | 0.9336 | 5.2297 | 1.6379 |

CS9 is a neat polyethylene containing no voiding agent.
*monolayer film

TABLE 3

| Example | VA | Film Density (g/cm3) | Void min Cross Section (μm) | Void Max Cross section (μm) | Void Average Cross section (μm) | Void Min Aspect ratio | Void Max Aspect ratio | Void Average Aspect ratio |
|---|---|---|---|---|---|---|---|---|
| IE2 | SMA1 | 0.7745 | 0.251 | 1.253 | 0.698 | 4.377 | 20.438 | 9.625 |
| IE5 | SAN1 | 0.7563 | 0.260 | 1.767 | 0.931 | 4.557 | 15.493 | 8.561 |

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A composition comprising:
(A) a continuous phase comprising an olefin-based polymer that is an enzyme-based polymer; and
(B) particles of a voiding agent dispersed in the continuous phase, the voiding agent comprising a functionalized styrene polymer having a glass transition temperature greater than or equal to 90° C., and the voiding agent is styrene maleic anhydride (SMA).

2. The composition of claim 1 wherein the particles of the voiding agent have an average cross-section diameter from 0.2 microns to less than 2.0 microns.

3. The composition of claim 1 comprising
from 70 wt % to 97 wt % of the olefin-based polymer; and
from 3 wt % to 30 wt % of the voiding agent.

4. The composition of claim 1 wherein the composition further comprises a film resin.

5. The composition of claim 4 wherein the composition comprises
the film resin; and
a masterbatch comprising (A) the olefin-based polymer and (B) the particles of the voiding agent.

6. An oriented article comprising:
(A) a continuous phase comprising an olefin-based polymer that is an ethylene-used polymer; and
(B) particles of a voiding agent dispersed in the continuous phase, the voiding agent comprising a functionalized styrene polymer having a glass transition temperature greater than or equal to 90° C., and the voiding agent is styrene maleic anhydride (SMA);
(C) a plurality of elongated voids dispersed throughout the continuous phase; and
the oriented article has a density less than 0.9 g/cc.

7. The oriented article of claim 6 comprising a second olefin-based polymer, the second olefin-based polymer different than the olefin-based polymer of the continuous phase.

8. The oriented article of claim 6 wherein the oriented article is selected from the group consisting of an oriented film article, an oriented sheet, an oriented fiber, an oriented filament, and an oriented tube.

9. The oriented article of claim 8 wherein the oriented film article is an oriented monolayer film.

10. The oriented article of claim 8 wherein the oriented film article is an oriented multilayer film and at least one of the layers of the oriented multilayer film comprises
(A) the continuous phase comprising an olefin-based polymer;
(B) the particles of a voiding agent dispersed in the continuous phase, the voiding agent comprising a functionalized styrene polymer having a glass transition temperature greater than or equal to 90° C.; and (C) a plurality of elongated voids dispersed throughout the continuous phase; and the oriented multilayer film has a density less than 0.9 g/cc.

11. The oriented article of claim 6 wherein the oriented article has a degree of orientation from 1,1× to 10× in a direction selected from the group consisting of a machine direction, a transverse direction, and both a machine direction and a transverse direction.

12. The oriented article of claim 10 wherein the multilayer film is a three-layer film with a core layer comprising (A) the continuous phase comprising the olefin-based polymer;

(B) the particles of the voiding agent dispersed in the continuous phase, the voiding agent comprising the functionalized styrene polymer having a glass transition temperature greater than or equal to 90° C.; and (C) a plurality of elongated voids dispersed throughout the continuous phase; and the oriented multilayer film has a density from 0.70 g/cc to 0.89 g/cc.

13. The oriented article of claim 9 wherein the ethylene-based polymer is an ethylene/$C_4$-$C_8$ α-olefin copolymer and the oriented monolayer film comprises from 3 wt % to 30 wt % particles of the voiding agent.

14. The oriented article of claim 10 wherein the continuous phase (A) comprises the olefin-based polymer that is an ethylene/$C_4$-$C_8$ α-olefin copolymer, and a second olefin-based polymer that is a second ethylene/$C_4$-$C_8$ α-olefin copolymer different than the ethylene/$C_4$-$C_8$ α-olefin copolymer for the olefin-based polymer.

15. The oriented article of claim 14 wherein the at least one of the layers comprises from 3 wt % to 30 wt % particles of the voiding agent.

16. The oriented article of claim 12 wherein the continuous phase (A) comprises the olefin-based polymer that is an ethylene/$C_4$-$C_8$ α-olefin copolymer, and a second olefin-based polymer that is a second ethylene/$C_4$-$C_8$ α-olefin copolymer different than the ethylene/$C_4$-$C_8$ α-olefin copolymer for the olefin-based polymer.

17. The oriented article of claim 16 wherein the core layer comprises from 3 wt % to 30 wt % particles of the voiding agent.

18. The oriented article of claim 17 comprising two skin layers, a skin layer on opposing sides of the core layer, each skin layer comprising an ethylene/$C_4$-$C_8$ α-olefin copolymer.

19. The oriented article of claim 18 wherein the ethylene/$C_4$-$C_8$ α-olefin copolymer in the skin layer is the same as the second ethylene/$C_4$-$C_8$ α-olefin copolymer in the core layer.

* * * * *

UNITED STATES PATENT AND TRADEMARK OFFICE
CERTIFICATE OF CORRECTION

| | |
|---|---|
| PATENT NO. | : 11,795,309 B2 |
| APPLICATION NO. | : 17/592067 |
| DATED | : October 24, 2023 |
| INVENTOR(S) | : Burton et al. |

It is certified that error appears in the above-identified patent and that said Letters Patent is hereby corrected as shown below:

In the Claims

Claim 1 – Column 17, Line 49, Replace "enzyme-based" with –ethylene-based–

Claim 6 – Column 18, Line 43, Replace "ethylene-used" with –ethylene-based–

Claim 11 – Column 19, Line 7, Replace "1,1x" with –1.1x–

Signed and Sealed this
Fourth Day of June, 2024

Katherine Kelly Vidal
*Director of the United States Patent and Trademark Office*